United States Patent
Kang et al.

(10) Patent No.: US 11,626,592 B2
(45) Date of Patent: Apr. 11, 2023

(54) LITHIUM-CARBON COMPOSITE HAVING CAVITIES FORMED THEREIN, AND METHOD FOR PRODUCING SAME

(71) Applicants: KOREA MARITIME UNIVERSITY INDUSTRY—ACADEMIC COOPERATION FOUNDATION, Busan (KR); GLOBAL FRONTIER HYBRID INTERFACE MATERIALS, Busan (KR)

(72) Inventors: Jun Kang, Busan (KR); Kwang Ho Kim, Busan (KR)

(73) Assignees: KOREA MARITIME UNIVERSITY INDUSTRY—ACADEMIC COOPERATION FOUNDATION; GLOBAL FRONTIER HYBRID INTERFACE MATERIALS

( * ) Notice: Subject to any disclaimer, the term of this patent is extended or adjusted under 35 U.S.C. 154(b) by 337 days.

(21) Appl. No.: 16/892,406

(22) Filed: Jun. 4, 2020

(65) Prior Publication Data

US 2020/0303737 A1    Sep. 24, 2020

Related U.S. Application Data

(63) Continuation of application No. PCT/KR2017/014497, filed on Dec. 12, 2017.

(30) Foreign Application Priority Data

Dec. 7, 2017    (KR) .................. 10-2017-0167786

(51) Int. Cl.
   *H01M 4/587*    (2010.01)
   *H01M 10/0525*    (2010.01)
   (Continued)

(52) U.S. Cl.
   CPC ............. *H01M 4/587* (2013.01); *C01B 32/05* (2017.08); *H01M 4/362* (2013.01); *H01M 10/0525* (2013.01)

(58) Field of Classification Search
   CPC ..................................................... H01M 4/587
   See application file for complete search history.

(56) References Cited

U.S. PATENT DOCUMENTS

| | | | |
|---|---|---|---|
| 8,894,723 B2* | 11/2014 | Nilsen .................. | H01M 6/188 29/623.5 |
| 2005/0196675 A1* | 9/2005 | Hashizume .......... | H01M 4/587 427/113 |

(Continued)

FOREIGN PATENT DOCUMENTS

| | | |
|---|---|---|
| JP | 2012-211049 A | 11/2012 |
| KR | 10-1636994 B1 | 7/2016 |
| KR | 10-2016-0101796 A | 8/2016 |

OTHER PUBLICATIONS

Korean Office Action (KR 10-2016-0060719), KIPO, dated Jul. 18, 2016.
(Continued)

*Primary Examiner* — Ula C Ruddock
*Assistant Examiner* — Thomas H. Parsons
(74) *Attorney, Agent, or Firm* — Park & Associates IP Law Office

(57) ABSTRACT

The present invention relates to a lithium-carbon composite having cavities formed therein and a method of manufacturing the same, the method including adding and mixing an organic solvent having an aromatic ring with a lithium precursor, arranging a pair of metal wires in the organic solvent, forming a lithium-carbon composite in which a carbon body is doped with lithium through plasma discharge in a solution, and annealing the lithium-carbon composite in order to remove hydrogen from the lithium-carbon compos- (Continued)

ite and form cavities in the lithium-carbon composite. Accordingly, a lithium-carbon composite can be simply synthesized using plasma discharge in a solution, and the synthesized lithium-carbon composite can be annealed to thus form cavities therein, thereby increasing the lithium charge and discharge performance of a lithium secondary battery using the lithium-carbon composite.

9 Claims, 16 Drawing Sheets

(51) Int. Cl.
*C01B 32/05* (2017.01)
*H01M 4/36* (2006.01)

(56) References Cited

U.S. PATENT DOCUMENTS

2014/0113200 A1  4/2014  Seymour
2015/0194661 A1  7/2015  Ju et al.

OTHER PUBLICATIONS

Korean Notice of Allowance (KR 10-2016-0060719), KIPO, dated Jan. 9, 2017.
International Search Report (PCT/KR2017/014497), WIPO, dated Sep. 7, 2018.
Maurin, et al., "Lithium Doping of Multiwalled Carbon Nanotubes Produced by Catalytic Decomposition", Nano Letters, 2001, vol. 1, No. 2, pp. 75-79.
Panomsuwan, Gasidit et al., "Solution Plasma Synthesis of Nitrogen-doped Carbon Nanoballs as Effective Metal-free Electrocatalysts for Oxygen Reduction Reaction", MRS Online Proceedings Library Archive, 2014, vol. 1641, inner pp. 1-6.
Kang, Jun, "Synthesis of a New Class of Carbon Nanomaterials by Solution Plasma Processing for Use as Air Cathodes in Li-Air Batteries", Journal of the Korean Society of Marine Engineering, 2015, vol. 39, No. 8, pp. 833-837.
Electrochemistry communications 59 (2015) 81-85.
Journal of Materials Chemistry A, 2017, 5, 23434-23439.

\* cited by examiner

LITHIUM-CARBON COMPOSITE HAVING CAVITIES FORMED THEREIN, AND METHOD FOR PRODUCING SAME

REFERENCE TO RELATED APPLICATIONS

This is a continuation of International Patent Application PCT/KR2017/014497 filed on Dec. 12, 2017, which designates the United States and claims priority of Korean Patent Application No. 10-2017-0167786 filed on Dec. 7, 2017, the entire contents of which are incorporated herein by reference.

FIELD OF THE INVENTION

The present invention relates to a lithium-carbon composite having cavities formed therein and a method of manufacturing the same, and more particularly to a lithium-carbon composite having cavities formed therein and a method of manufacturing the same, in which a lithium-carbon composite may be simply synthesized using plasma discharge in a solution, the synthesized lithium-carbon composite is annealed to thus form cavities therein, and additional cavities are formed through a delithiation process, thereby maximizing lithium storage capacity.

BACKGROUND OF THE INVENTION

In recent years, as the demand for various small and lightweight electronic devices and ultra-high-capacity power storage systems has rapidly increased, worldwide interest in new energy sources has increased. Accordingly, research and development is focused on lithium secondary batteries, which are environmentally friendly, have high energy density, are capable of being rapidly charged and discharged, and have excellent cycle stability. In particular, various types of carbon-based, metal-based, and oxide-based materials, serving as anode active materials for lithium secondary batteries, play a key role in increasing the output and density of energy, and thus are intensively studied and commercialized.

Silicon (Si), which is used as an anode active material, has a high theoretical capacity and is a metal element that enables charging and discharging of lithium ions through alloying and dealloying with lithium (Li). Since silicon shows superior capacity per unit weight and volume compared to graphite, which is a conventional anode active material, it is being actively researched as a next-generation high-capacity lithium secondary battery material. However, despite the high theoretical capacity of silicon, it is not easy to commercialize because a large structural change and a large volume expansion of 400% or more over the original size occur in the process of alloying silicon and lithium. Silicon is fragile due to the volume expansion and consequent deterioration in mechanical stability thereof may occur attributed to mechanical stress due to the volume change. Therefore, the electrode forming the silicon-lithium alloy cracks and breaks, thereby deteriorating electrical contact between particles and thus rapidly decreasing capacity within several charge and discharge cycles, which is undesirable. Moreover, the reversible capacity is reduced due to the formation of a new solid electrolyte interface (SEI) layer on the surface of the broken particles.

Meanwhile, various attempts to minimize problems due to the volume expansion are underway. As a representative thereof, there is a method of suppressing volume expansion through a void space in a carbon body by encapsulating silicon in a yolk-shell structure or a core-shell structure in a carbon body. As another method, there is proposed a method of suppressing volume expansion by lithium oxide, which is formed together upon alloying using a metal oxide material capable of being alloyed with lithium. However, the former case is not efficient with regard to the manufacturing process because of the high cost, multiple processing steps, and long processing time, and in the latter case, there are additional problems of increased irreversible capacity due to the formation of lithium oxide and low electrical conductivity of the metal oxide alone, which have yet to be overcome.

SUMMARY OF THE INVENTION

Accordingly, an objective of the present invention is to provide a lithium-carbon composite having cavities formed therein and a method of manufacturing the same, in which issues such as electrode degradation due to volume expansion and electrical conductivity are intended to be eliminated by fundamentally excluding materials such as silicon and metal oxide, and in which lithium storage capacity may be maximized using a carbon material alone.

Another objective of the present invention is to provide a lithium-carbon composite having cavities formed therein and a method of manufacturing the same, in which a lithium-carbon composite may be simply synthesized using plasma discharge in a solution, and the synthesized lithium-carbon composite may be subjected to annealing and delithiation to thus form a large number of cavities therein, thereby increasing lithium charge and discharge performance.

In order to accomplish the above objectives, the present invention provides a method of manufacturing a lithium-carbon composite having cavities formed therein, including adding an organic solvent having an aromatic ring with a lithium precursor and performing mixing, arranging a pair of metal wires in the organic solvent, forming a lithium-carbon composite in which a carbon body is doped with lithium through plasma discharge in a solution, and annealing the lithium-carbon composite in order to remove hydrogen from the lithium-carbon composite and form cavities in the lithium-carbon composite.

Here, the organic solvent may be an organic solvent containing a hydrocarbon (HC), which is present in a solution at room temperature and is composed exclusively of carbon (C) and hydrogen (H) without other elements, and is preferably selected from the group consisting of xylene, benzene, toluene and mixtures thereof.

The lithium precursor is cyclopentadienyl lithium, and the pair of metal wires is preferably made of a metal material having a melting point higher than 2000° C.

The forming the lithium-carbon composite preferably includes performing decomposition and then polymerization of the lithium precursor and a carbon precursor through plasma discharge by applying bipolar-pulsed direct-current power to the metal wires, thereby forming a lithium-carbon composite in which lithium is doped in the carbon body.

Preferably, lithium is diffused and thus the internal structure of the carbon body is disordered and lithium is agglomerated through diffusion, cavities are formed in a region in the carbon body in which lithium is not present, and additional cavities are preferably formed in the carbon body through delithiation of the agglomerated lithium.

When the lithium-carbon composite is annealed, the hydrogen attached to the carbon body is preferably removed so that carbon is bound to the position to which hydrogen was attached to form a carbon-carbon bond, and heat treatment is preferably conducted at 400° C. or more.

In addition, the present invention provides a lithium-carbon composite having cavities formed therein, in which a carbon body is doped with lithium through plasma discharge in a solution and in an interior of which cavities are formed through annealing, and which has a composition of $LiC_x$ (in which x is 4 to 2-y, y being 0.001 to 1.999).

According to the present invention, a lithium-carbon composite can be provided, in which issues such as electrode degradation due to volume expansion and electrical conductivity are eliminated by fundamentally excluding materials such as silicon and metal oxides, and lithium storage capacity can be maximized using a carbon material alone.

Moreover, a lithium-carbon composite having cavities formed therein can be provided, in which a lithium-carbon composite can be simply synthesized through plasma discharge in a solution, and the synthesized lithium-carbon composite is subjected to annealing and delithiation to thus form a large number of cavities therein, thereby increasing lithium charge and discharge performance.

DETAILED DESCRIPTION OF THE INVENTION

Hereinafter, a detailed description will be given of a lithium-carbon composite having cavities formed therein and a method of manufacturing the same according to embodiments of the present invention with reference to the accompanying drawings.

The present invention pertains to a lithium-carbon composite, in which a carbon body is doped with lithium through plasma discharge in a solution and in an interior of which cavities are formed through annealing, and which has a composition of LiCx (in which x is 4 to 2-y, y being 0.001 to 1.999).

Figure 1:
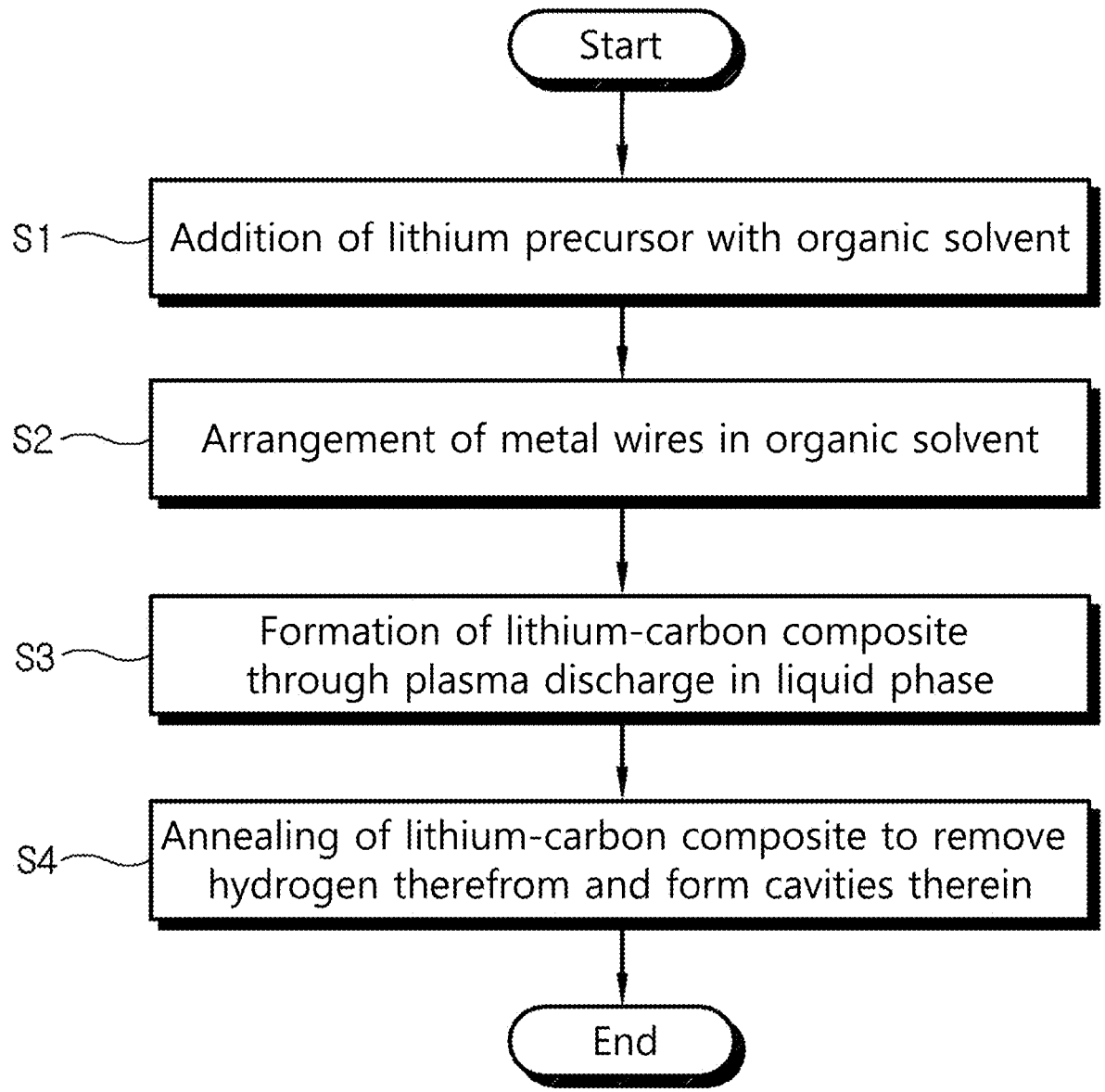
FIG. 1 is a flowchart showing a process of manufacturing a lithium-carbon composite having cavities formed therein according to an embodiment of the present invention.

As shown in FIG. 1, a method of manufacturing the lithium-carbon composite includes adding an organic solvent having an aromatic ring with a lithium precursor and performing mixing (51).

In the present invention, in order to form a lithium-carbon composite having cavities formed therein, an organic solvent having an aromatic ring is added and mixed with a lithium precursor. Here, the organic solvent is used as a carbon (C) source, and an organic solvent containing carbon has to be used in order to form a carbon radical. In particular, an organic solvent having an aromatic ring is used in the present invention.

The organic solvent is largely classified into an organic solvent having a linear structure and an organic solvent having an aromatic ring. In the case of the organic solvent having a linear structure, the carbon composite obtained in subsequent steps has a plate shape and the yield thereof is very low. Since the carbon composite in a plate shape is not suitable for lithium doping in an interior thereof, in the present invention, an organic solvent having an aromatic ring is used, rather than an organic solvent having a linear structure. When an organic solvent having an aromatic ring is adopted, carbon may agglomerate into ball shapes and thus the interior thereof may be doped with lithium, and moreover, it is possible to attain a shape capable of forming cavities therein, which is the purpose of the present invention.

In particular, the solvent suitable for use as the organic solvent having an aromatic ring is an organic solvent containing a hydrocarbon (HC), which is present in a solution at room temperature and is composed exclusively of carbon (C) and hydrogen (H) without other elements. Specifically, the organic solvent may be selected from the group consisting of xylene, benzene, toluene and mixtures thereof, among which the solvent that enables the highest yield to be obtained is xylene. In the case in which the organic solvent contains other elements such as oxygen (O) in addition to carbon and hydrogen, the likelihood of lithium being oxidized is very high.

The lithium precursor that is added to the organic solvent is preferably cyclopentadienyl lithium. Cyclopentadienyl lithium is most preferably used because it is dissolved well in an organic solvent and is harmless to the human body. Specifically, lithium precursors other than cyclopentadienyl lithium have poor solubility in organic solvents, so lithium cannot be doped in carbon, and such precursors are not suitable for use in experiments because they are dangerous to the human body.

A pair of metal wires is arranged in the organic solvent (S2).

Figure 2:
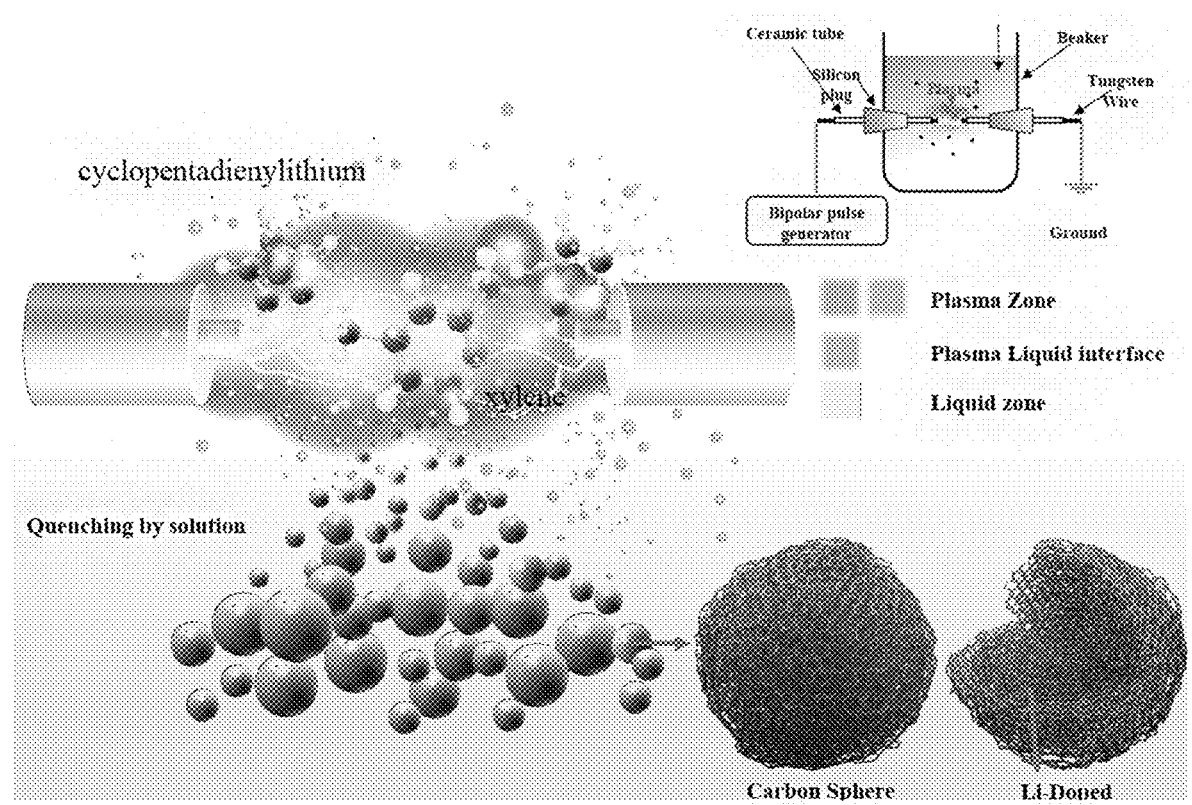
FIG. 2 shows a process of manufacturing a lithium-carbon composite.

As shown in FIG. 2, in order to form a lithium-carbon composite through plasma discharge, a chamber, a pair of electrodes located in the chamber, and a power supply applying electricity to the electrodes are prepared. Here, the chamber is used to store the organic solvent and the lithium precursor in an interior thereof, and provides a space in which plasma discharge occurs. A pair of electrodes facing each other is disposed in the chamber, and a metal wire is disposed at an end of each electrode and thus the metal wires are arranged in a line along a longitudinal direction so as to face each other. The metal wires are immersed in the organic solvent stored in the chamber, followed by plasma discharge, resulting in the lithium-carbon composite of the present invention.

The metal wires are a material that is disposed to cause plasma discharge in the organic solvent using the electricity received from the electrodes. The material for the metal wires has to be made of a metal having a melting point higher than 2000° C. If the melting point of the metal wire is 2000° C. or less, the metal wires may be melted by plasma discharge and may be mixed in the form of metal particles between the lithium precursor and the carbon, making it impossible to obtain a desired lithium-carbon composite. Specifically, in order to attain a lithium-carbon composite not including metal particles, it is preferred that the metal wires made of metal having a melting point higher than 2000° C. be disposed so that plasma discharge is carried out. Here, the metal for the metal wires having a melting point higher than 2000° C. is preferably selected from the group consisting of hafnium (Hf), tantalum (Ta), niobium (Nb), molybdenum (Mo), tungsten (W), technetium (Tc), rhenium (Re), ruthenium (Ru), osmium (Os), iridium (Ir) and mixtures thereof.

When the pair of metal wires is arranged in a line along the longitudinal direction, the distance between the metal wires is preferably 1 to 2 mm. If the distance between the metal wires is less than 1 mm, the lithium-carbon composite produced between the metal wires may be sandwiched between the metal wires due to the narrow distance, and the subsequent production of a lithium-carbon composite may be interrupted, thereby ending plasma discharge. On the other hand, if the distance between the metal wires exceeds 2 mm, the organic solvent is a nonpolar solvent and thus has no dielectric constant, and ultimately, when the distance between the metal wires increases, plasma discharge does not occur. Hence, it is desirable that the distance between the pair of metal wires be 1 to 2 mm which is the most suitable for plasma discharge.

A lithium-carbon composite doped with lithium is formed through plasma discharge in a solution (S3).

Figure 3:
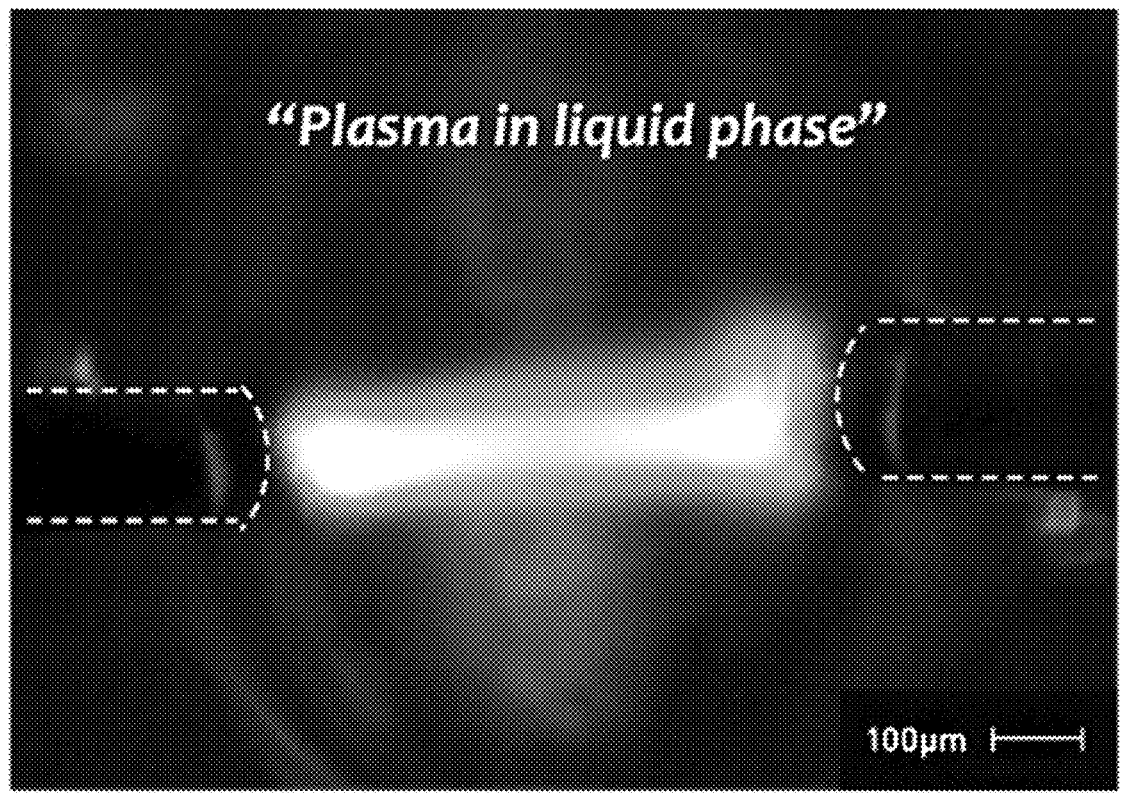
FIG. 3 shows plasma discharge in a solution.

When bipolar-pulsed direct-current (DC) power is applied to the pair of metal wires that are connected to respective ends of the electrodes and immersed in the organic solvent in S2, as shown in FIGS. 2 and 3, plasma discharge instantaneously occurs, and the lithium precursor and the carbon precursor based on carbon of the organic solvent are decomposed and then polymerized through plasma discharge, thereby doping the carbon body with lithium. Specifically, discharge may be caused in the organic solvent via the metal wires, whereby the lithium precursor is formed into lithium radicals, and simultaneously, the carbon contained in the organic solvent is formed into carbon radicals, which immediately agglomerate and are polymerized. The carbon agglomerates due to polymerization to afford a carbon body. Here, the lithium radicals are intercalated into the carbon at the same time as the carbon agglomerates, and thus the lithium atoms are doped in a form in which carbon is disposed around the lithium atoms. Therefore, the lithium-carbon composite having the above structure thus obtained is configured such that carbon surrounds lithium atoms, which have a very small diameter, and thus, even when lithium ions are charged and discharged in the lithium secondary battery, the volume change may be reduced, thus preventing problems of mechanical stress and mechanical stability due to the volume change.

Plasma discharge is preferably carried out at a pulse width of 3.0 µs or less. If the pulse width exceeds 3.0 µs, arc plasma may occur, rather than plasma discharge. When arc plasma is maintained for at least a predetermined period of time, the temperature of the organic solvent may increase due to the generation of a large amount of current. When the temperature of the organic solvent increases, the organic solvent boils and evaporates, and the production of the lithium-carbon composite is stopped. Under arc plasma, the sputter speed of the electrode increases, so plasma is no longer generated due to the increased distance between the electrodes. Hence, the applied power preferably has a pulse width of 3.0 µs or less.

The frequency of the pulsed DC power that is applied is preferably 15 kHz or more. If the frequency thereof is less than 15 kHz, plasma may be deactivated. The plasma discharge is preferably carried out in the voltage range of 1500 to 2000 V. If the voltage is less than 1500 V, plasma may be deactivated during plasma discharge due to insufficient voltage. On the other hand, if the voltage exceeds 2000 V, arc plasma may occur instead. When arc plasma occurs, the properties of carbon may change and the carbon may not be properly polymerized, making it impossible to obtain a desired lithium-carbon composite.

The reason for forming a lithium-carbon composite through plasma discharge in a solution, rather than plasma discharge in a gas phase, is as follows. When an oxygen atom is introduced during the synthesis of a lithium-carbon composite, the likelihood of formation of lithium oxide, which is an irreversible material, becomes very high, which is not helpful for improving the performance of the material. Therefore, plasma discharge is carried out in an organic solvent composed exclusively of hydrocarbon without oxygen.

The lithium-carbon composite thus manufactured may be obtained in the organic solvent using any one or all of sorting, washing, filtration and precipitation, and the lithium-carbon composite thus obtained is dried, thereby completely removing the remaining organic solvent. Ultimately, the lithium-doped lithium-carbon composite may be obtained in the form of a pure powder.

The lithium-carbon composite is annealed to thus remove hydrogen and form cavities therein (S4).

The lithium-carbon composite manufactured in S3 is configured such that the polymerized carbon body is doped with lithium, and when such a lithium-carbon composite is annealed, hydrogen is removed and the amorphous lithium-carbon composite is formed into nanocrystalline graphite. Here, during the annealing process, lithium is agglomerated between nanocrystalline graphite flakes, and as annealing proceeds further, the agglomerated lithium is intensively intercalated between graphene layers in the nanocrystalline graphite while leaving cavities between the flakes. Therefore, the lithium-carbon composite has a $LiC_x$ structure in which cavities are formed and one or more lithium atoms are doped for every two carbon atoms. Briefly, a highly dense crystalline lithium-carbon composite having a $LiC_x$ structure (in which x is 4 to 2-y, y being 0.001 to 1.999) may result.

When the lithium atoms thus agglomerated are released from the carbon body during delithiation, new cavities are additionally formed in the carbon body.

More specifically, when the lithium-carbon composite is applied to a lithium secondary battery, lithium is charged and discharged in the lithium-carbon composite through lithium charge and discharge processes. Here, during discharging of lithium, randomly agglomerated lithium already present in the lithium-carbon composite undergoes delithiation, and cavities are formed at the position at which the agglomerated lithium was present. Since the cavities thus formed provide a space for a subsequent lithium charge process, superior lithium charge and discharge performance may be obtained. Since these cavities are continuously formed in the lithium-carbon composite, the charge and discharge performance and cycle number of the lithium secondary battery may be much higher than those of the existing lithium secondary battery.

Moreover, hydrogen (H) attached to the carbon body is removed through annealing. In the case in which hydrogen is present, carbon-carbon bonding of the carbon body is not properly conducted, and the carbon-hydrogen bond remains. Specifically, a carbon body having a size sufficient to form cavities therein is not formed, and individual small carbon bodies may be separately present. In this case, the effects of agglomerating lithium in the carbon body and then releasing lithium to form cavities cannot be expected.

Here, the annealing temperature is preferably 400° C. or higher. If the annealing temperature is lower than 400° C., lithium atoms may not be efficiently doped in the carbon body, and some of them may be present in the form of a lithium precursor, making it difficult to form a $LiC_x$ lithium-carbon composite desired in the present invention. Furthermore, since hydrogen is not completely removed from the lithium-carbon composite, carbon-carbon bonds may not be formed, and some hydrogen-binding portions may remain. Hence, the annealing temperature has to be 400° C. or higher.

The lithium-carbon composite manufactured through S1 to S4 has a composition of $LiC_x$ (in which x is 4 to 2-y, y being 0.001 to 1.999). Also, the amount of lithium is 4 to 6 wt % based on 100 wt % of the lithium-carbon composite. Since conventional lithium-carbon composites having a high carbon ratio, such as $LiC_3$ and $LiC_6$, are mainly used, it is difficult to form a lithium-carbon composite having a composition of $LiC_{2-x}$ as in the present 120 invention. However, in the present invention, not only a $LiC_{2-x}$ lithium-carbon composite, which may exhibit high power density, high energy density, and superior cycle stability, but also $LiC_2$, $LiC_3$ and $LiC_4$ may be manufactured in a very simple manner.

A better understanding of the present invention will be given through the following examples.

EXAMPLE 1

Manufacture of Lithium-Carbon Composite

As for electrodes for plasma discharge, a tungsten wire having a diameter of 1 mm (purity of 99.9%, Nilaco Corp., Japan) was used. The electrodes were covered with a ceramic tube having a protrusion length of 1 mm in order to intensively apply energy thereto. Next, the electrodes were disposed in a beaker containing cyclopentadienyl lithium dissolved in xylene, and plasma discharge was carried out using a bipolar-pulsed DC power supply (Kurita, Japan). Here, the voltage was 2.0 kV, the pulse frequency was 100 kHz, the pulse width was 0.7 μs, and the experiment was performed at room temperature under atmospheric pressure.

In order to increase the electrical conductivity of the synthesized lithium-carbon (Li—C) composite and remove hydrogen present in the lithium-carbon composite, the carbon material was placed in a tube furnace and then annealed at 500° C. for 3 hr in a nitrogen atmosphere. Here, the annealing was performed at 10° C./min and then the furnace was cooled.

EXAMPLE 2

Measurement of Li—C Properties

The Li—C form of the carbon material thus manufactured was observed via HAADF-STEM using a TALOS F200X. Also, the lithium distribution in carbon was measured through TOF-SIMS using an ION-TOF (Munster, Germany). The chemical composition of the surface thereof was measured using a K-ALPHA+XPS system (Thermo Fisher Scientific, U.K.). X-ray photoelectron spectroscopy was performed by scanning monochromatic Al Kα rays (1,486.6 eV; spot size, 400 μm). The angle between the sample surface and the analyzer was 90°, and information about C1s, O1s and Li1s elements was collected for all scans with X-ray beams. Here, a spot size of 400×400 μm was used.

Depth profiling is a process in which the amount or concentration of an atom is plotted as a function of depth from the surface. This depth profiling was conducted using an argon (Ar) gas ion source of a device operating at 3 kV and 1 μA, and a gradient was formed at 45° relative to the surface normal in the 1.5×3 mm region.

In order to investigate the state of lithium in Li—C, solid-state $^7$Li NMR measurement was performed using an AVANCE III HD spectrometer (Bruker, Germany) at 400 MHz. The Li—C surface area was calculated using a Brunauer-Emmett-Teller (BET) method (Autosorb-iQ, Quantachrom Instrument, USA), and samples were degassed at 200° C. for 2 hr before BET measurement.

EXAMPLE 3

Preparation of Li—C Electrode and Analysis of Electrochemical Properties

An electrochemical test on Li—C was performed using 2032 coin-type (Wellcos Corp.) half-cells. In order to manufacture a working electrode, a slurry was formed by mixing an active material, conductive carbon black (TIMCAL Graphite & Carbon Super P®), and a polyacrylic acid binder (Average Mw: ~3,000,000) at a weight ratio of 7:1:2 with distilled water. The slurry was mixed at a revolution rate of 400 to 2000 rpm and at a rotation rate of 160 to 800 rpm for 30 min using an AR-100 conditioning mixer (THINKY Corp.) and homogenized for 10 min at a revolution rate of 2200 rpm. Thereafter, the slurry was uniformly applied on a copper (Cu) foil using a doctor blade. Next, the copper foil was dried overnight at 50° C. to thus remove the solvent, and was then pressed using a roll press. Here, the mass load of the electrode material on the current collector was about 0.8 mg/cd.

A lithium metal foil as a counter electrode and a coin cell were assembled in an argon-filled glove box, and an electrolyte containing 1 M $LiPF_6$ in a 1:1 (v/v) ethylene-carbonate/dimethyl-carbonate mixture and 10 wt % of fluoroethylene carbonate was used. The electrochemical test was performed in the voltage range of 0.005 V (vs. Li/Li$^+$) using a BCS-805 biologic battery test system (Biologic, France). Cyclic voltammetry was performed using the same workstation in order to measure reduction and oxidation peaks in the voltage range of 0.1-0.0 V (vs. Li/Li$^+$) at a scan rate of 0.2 mV/s.

Figure 4:
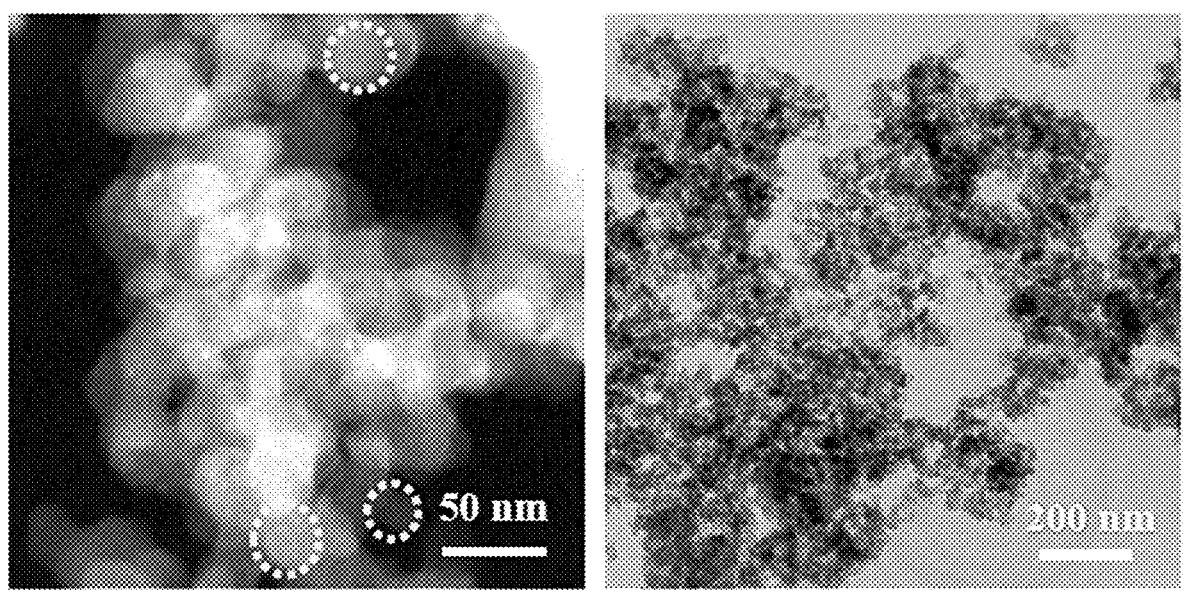
FIG. 4 is images showing the morphology of the lithium-carbon composite.
Figure 5:
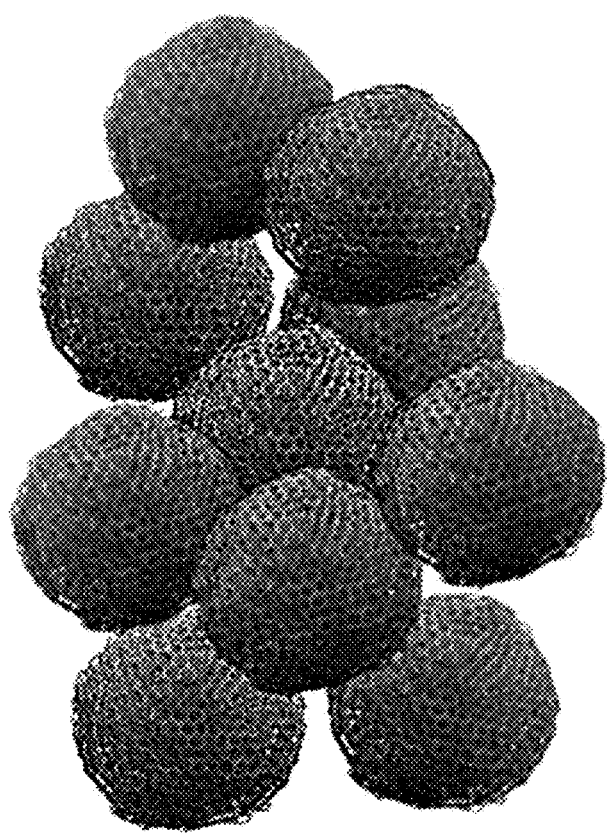
FIG. 5 shows a lithium-carbon composite in a carbon black form.
Figure 6:
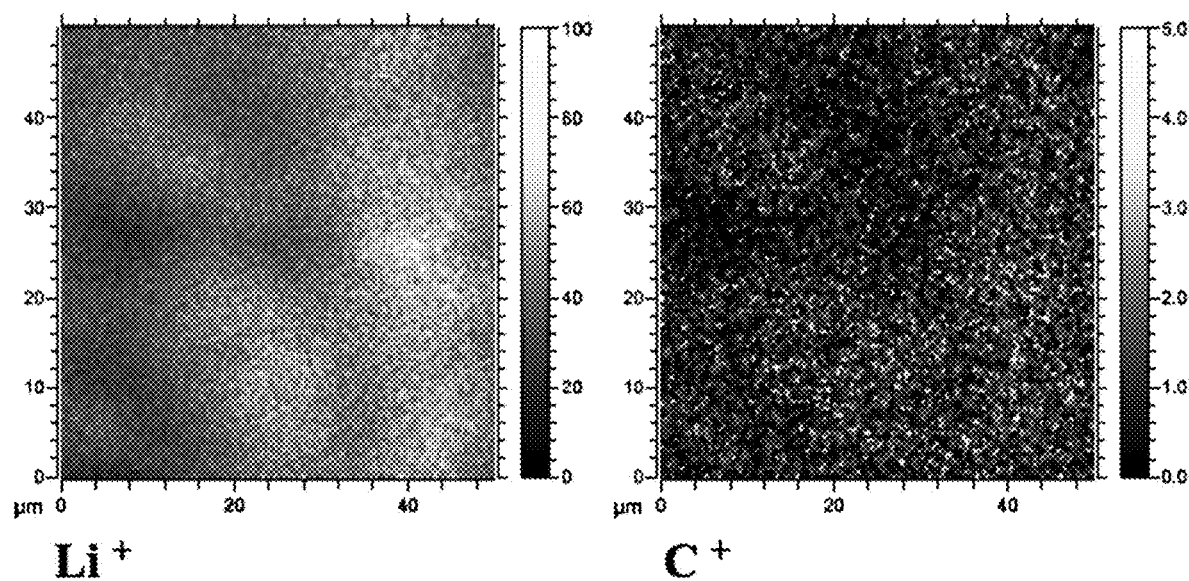
FIG. 6 shows mapping images of time-of-flight secondary ion mass spectrometry (ToF-SIMS) of the lithium-carbon composite.

FIG. 4 is images showing the morphology of the lithium-carbon composite. The lithium-carbon composite of the present invention was synthesized in an average amount of 6 to 7 g per hour through plasma discharge in a solution. The lithium-carbon composite was observed using a transmission electron microscope (TEM). The lithium-carbon composite was obtained in the form of carbon black, as shown in FIG. 5. FIG. 6 is mapping images of time-of-flight secondary ion mass spectrometry (ToF-SIMS) showing the uniform distribution of lithium in carbon.

Figure 7:
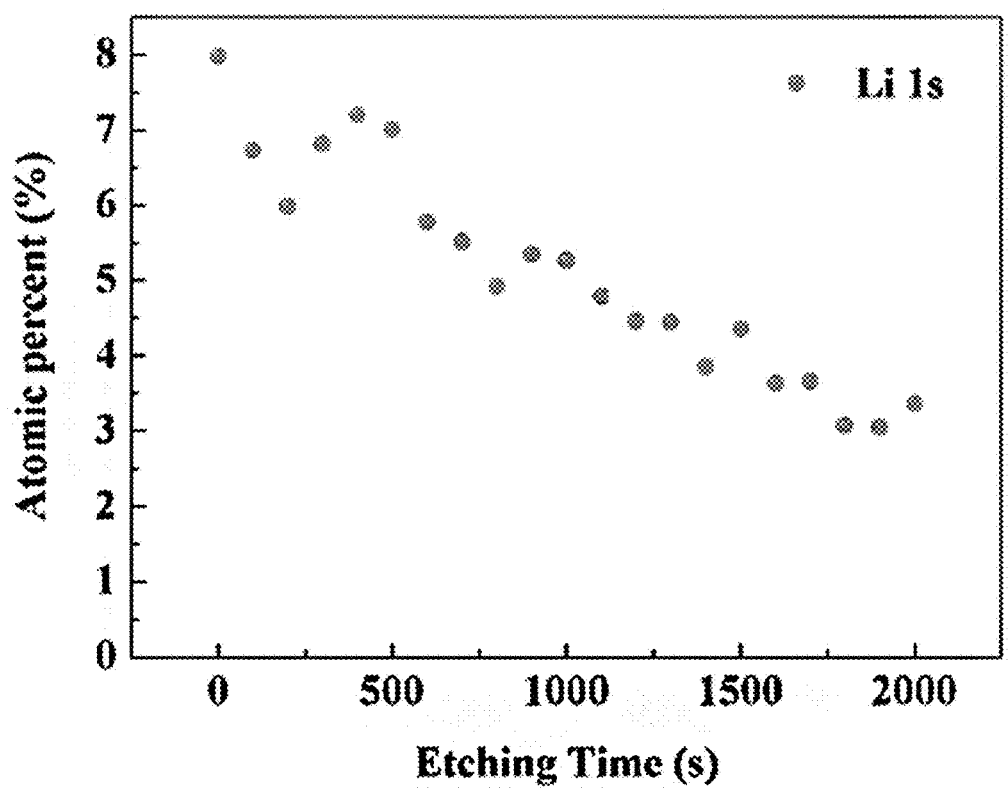
FIG. 7 is a graph showing an atomic percent (%) obtained through etching of the lithium-carbon composite.

FIG. 7 shows the results of high-resolution X-ray photoelectron spectroscopy (XPS) on the surface in order to determine the composition of doped lithium. In order to confirm the composition of lithium in the lithium-carbon composite, an atomic percent (%) was measured while the lithium-carbon composite was etched from the top. As shown in FIG. 7, based on the results of measurement of atomic % depending on the etching time, the atomic % was 4 to 6 wt % on average. Most of the lithium atoms are deemed to be present on the carbon sphere. Also, the amount of lithium on the surface is estimated to be about 0.75 wt %.

Figure 8:
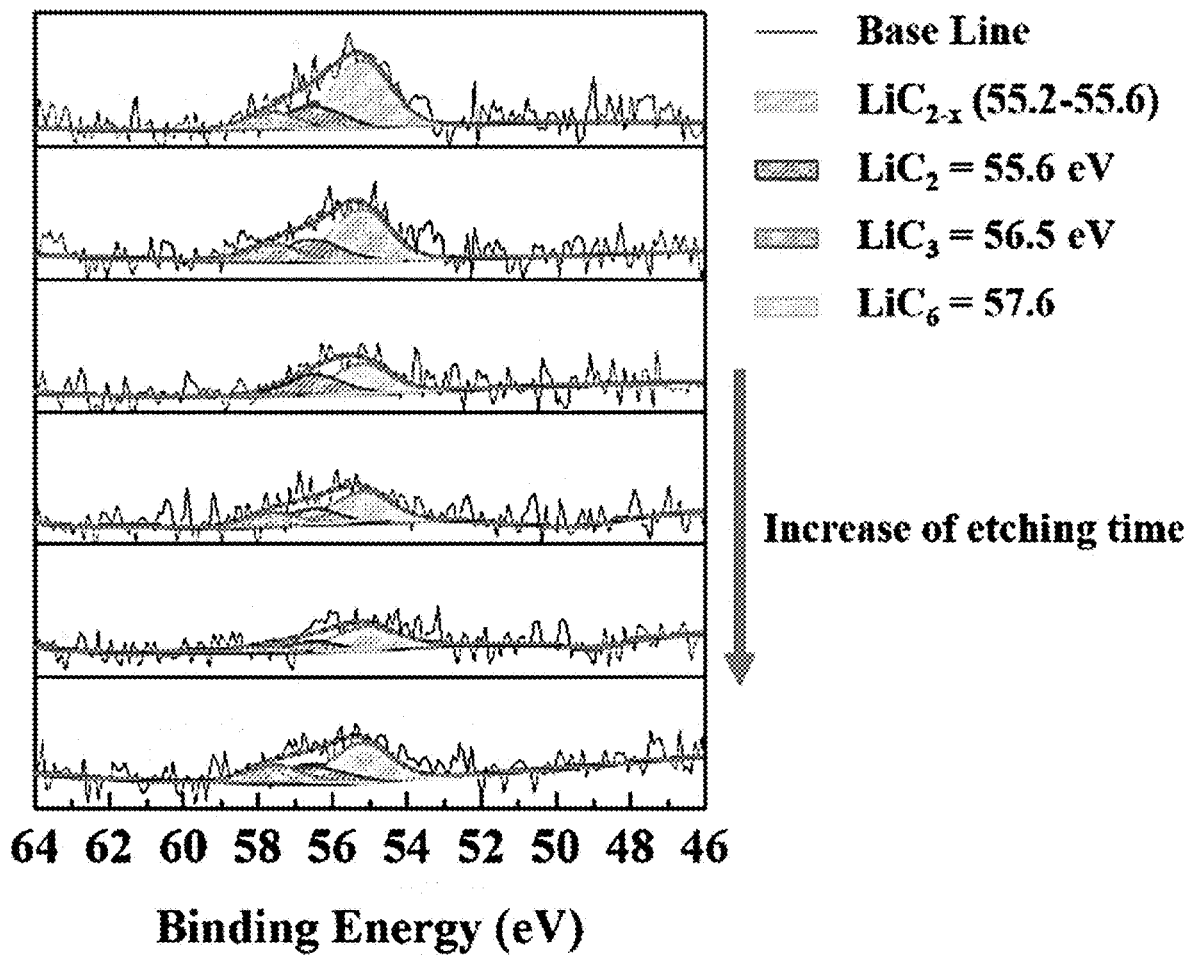
FIG. 8 shows XPS core level spectra obtained through etching of the lithium-carbon composite.

XPS depth profile analysis was performed in order to confirm the presence of lithium in the carbon and to determine the carbon composition distribution depending on the depth. FIG. 8 shows XPS core level spectra, in which carbon was etched using sputtering from 100s to 1900s in 300s increments. The $LiC_{2-x}$ of the present invention was observed to have a main peak at 55.2-55.6 eV, and the other compositions, namely $LiC_2$, $LiC_3$ and $LiC_6$, were observed to have small peaks.

Figure 9:
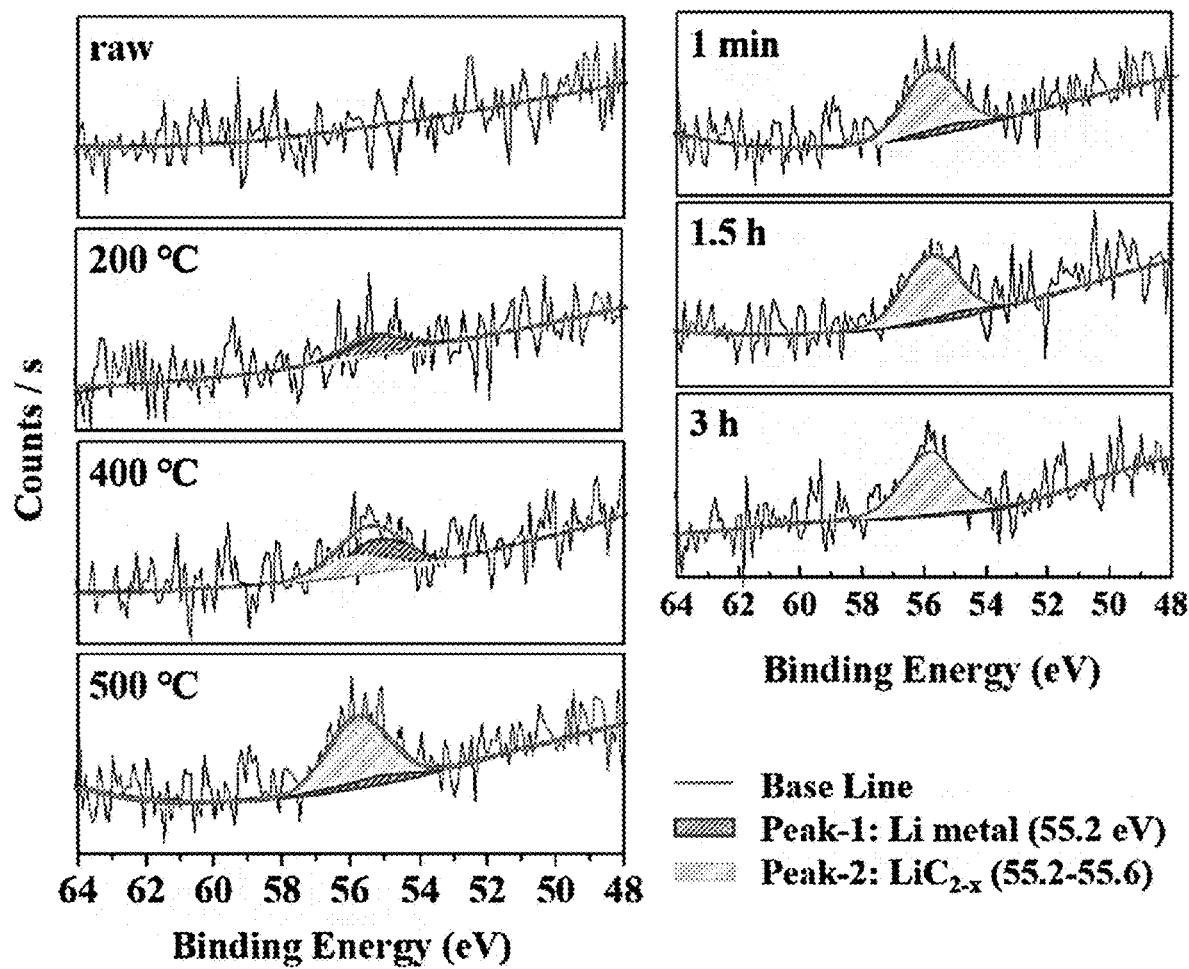
FIG. 9 shows XPS spectra confirming the composition of the lithium-carbon composite depending on the annealing temperature and time.

FIG. 9 shows XPS spectra confirming the composition of the lithium-carbon composite depending on the annealing temperature and time, in which Peak-1 corresponds to the lithium atom or lithium precursor (55.2 eV) and Peak-2 corresponds to $LiC_{2-x}$ (55.2-55.6 eV). When heat treatment was performed at low temperatures, the proportion of Peak-1 was high. At a high temperature of 500° C., Peak-2, rather than Peak-1, was observed to be significantly high. It can be seen that as the temperature increased, the intensity of Peak-1 decreased, and a new peak, Peak-2, appeared and the intensity of Peak-2 gradually increased.

Furthermore, in the XPS spectra confirming the composition of the lithium-carbon composite depending on the annealing time, as the annealing time was increased from 1 min to 3 hr, Peak-1 gradually decreased and Peak-2 increased. This is because the lithium precursor or the lithium atoms present in a doped state diffuse and move with an increase in temperature and are then excessively agglomerated at a specific position in the carbon matrix.

Figure 10:
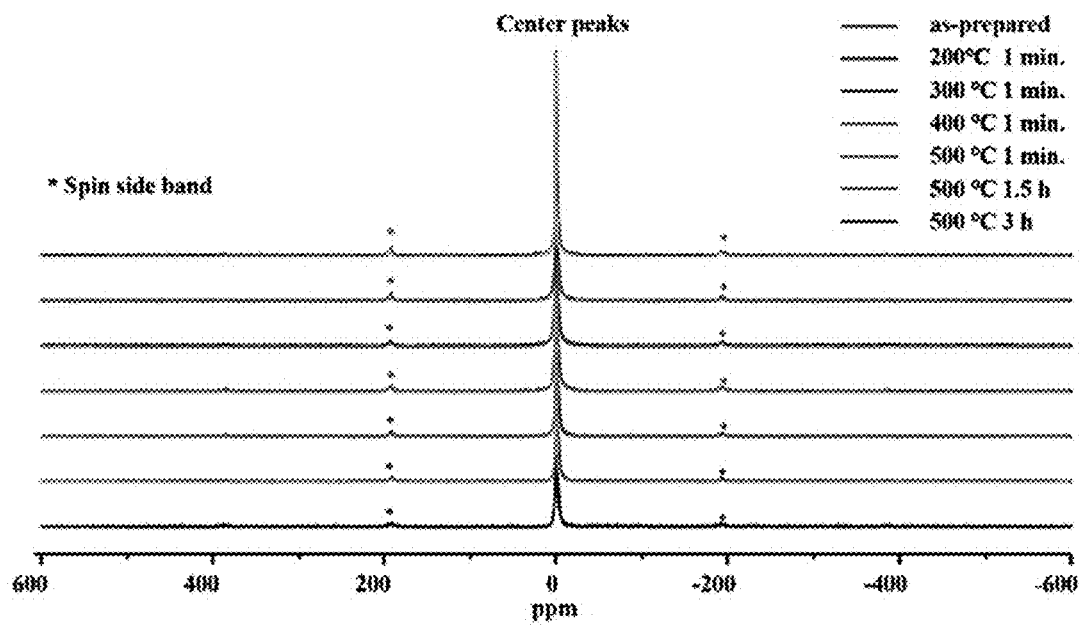
FIG. 10 shows Li NMR spectra of the lithium-carbon composite.
Figure 10:
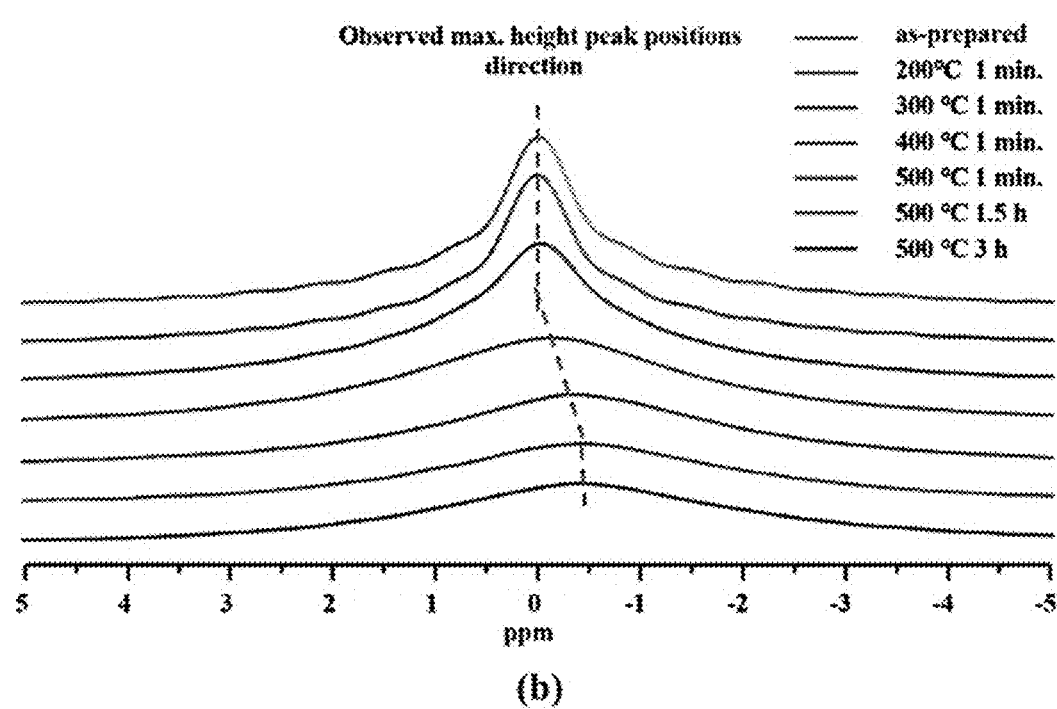

Moreover, the solid-state MAS (magic angle spinning) NMR spectrum results of the lithium-carbon composite were compared with the XPS analysis results, thus obtaining more information about the lithium-carbon composite atomic state. FIG. 10 shows $^7Li$ NMR. In FIG. 10a, no metal band appeared, and only one band was clearly observed at ~0 ppm. These results indicate that lithium present in the lithium-carbon composite did not bind to other elements, such as oxygen, and corroborate the XPS results.

FIG. 10b shows an enlarged NMR image in a narrower range, and the observed shifts are indicated by a dotted line to show chemical shift changes. It was confirmed that there was no drastic change in peak position upon heat treatment up to 300° C. but that the chemical shift of the samples annealed for 1.5 hr at 400° C. and 500° C. moved to a lower frequency (upward electric field). Also, there was almost no peak shift for the samples annealed at 500° C. for 1.5 hr and 3 hr, and the samples treated at 200° C. for 1 min and 300° C. for 1 min included two components, namely Peak-1 and Peak-2.

The narrow Peak-2 below 1 ppm of the half width appearing in the sample annealed at ~300° C. is due to fast-moving diamagnetic lithium material (e.g. decomposed from the precursor during heat treatment or synthesis), and Peak-1 is presumed to be due to slow-moving diamagnetic lithium material (e.g. adsorbed on a solid molecule or present as fixed lithium in the molecular structure).

As can be seen in FIG. 10, Peak-1 and Peak-2 of the center peaks are deconvoluted into a Lorentzian line shape and a Gaussian line shape, respectively, and the relative peak ratio was calculated as shown in Table 1 below. Table 1 below shows the chemical shift, half width and relative ratio of Peak-1 and Peak-2 in the $^7Li$ NMR spectra of the lithium-carbon composites annealed at various temperatures.

TABLE 1

| | Sample | | | | | | | | |
|---|---|---|---|---|---|---|---|---|---|
| | As-prepared | | Annealed at 200° C. for 1 min | | Annealed at 300° C. for 1 min | | Annealed at 400° C. for 1 min | Annealed at 500° C. for 1 min | Annealed at 500° C. for 1.5 hr | Annealed at 500° C. for 3 hr |
| Peak type | Peak-1 | Peak-2 | Peak-1 | Peak-2 | Peak-1 | Peak-2 | Peak-1 | Peak-1 | Peak-1 | Peak-1 |
| Chemical shift (ppm) | 0 | 0 | 0 | 0 | 0 | 0 | −0.2 | −0.3 | −0.4 | −0.4 |
| Half width (ppm) | 3.3 | 0.6 | 3.5 | 0.7 | 3.7 | 0.8 | 3.6 | 3.4 | 3.5 | 3.5 |
| Rel. Area (%) (P1 to P2) | 85.5 | 14.5 | 86 | 14 | 90 | 10 | — | — | — | — |

The relative ratio of Peak-2 was decreased at 200° C. for 1 min, but the change thereof was not significant. However, the intensity of Peak-2 (10%) when annealed at 300° C. was significantly reduced compared to the intensity at 200° C. In the sample annealed at 400° C. for 1 min, Peak-2 almost completely disappeared from the lithium spectrum and broad Peak-1 alone appeared. Also, samples heated at 500° C. for 1 min, 1.5 hr, and 3 hr showed a shift from −0.3 ppm to −0.4 ppm, but the difference was insignificant.

Figure 11:
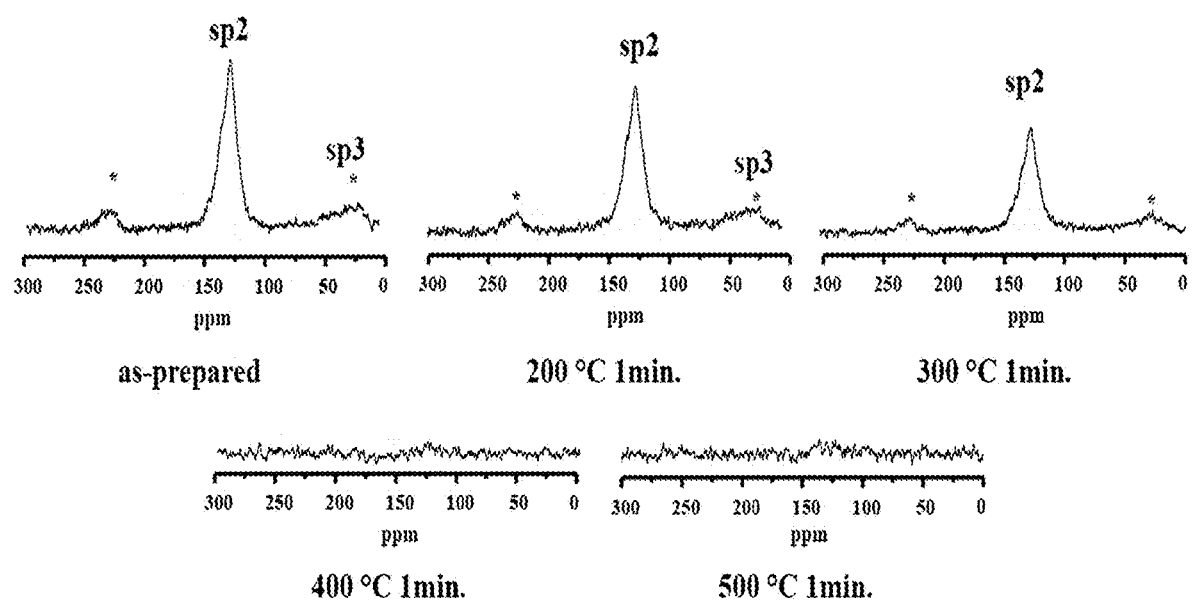
FIG. 11 shows C-H CPMAS NMR spectra of the lithium-carbon composite.

FIG. 11 shows $^{13}C$-$^1H$ CPMAS NMR spectra in order to confirm that the peak shift of lithium is related to the change in the carbon crystalline structure. The $^{13}C$-$^1H$ CPMAS NMR spectra were obtained for samples not annealed (as-prepared) and annealed at 200° C. for 1 min and at 300° C. for 1 min, and were not observed in samples treated at 400° C. or higher. In the spectra of the as-prepared sample and the sample annealed at 200° C. for 1 min, an $sp^3$ carbon peak in the range of 10-0 ppm was observed. This means that the lithium-carbon composite has a random and amorphous structure due to the large number of alkyl groups.

However, in the sample annealed at 300° C. for 1 min, the $sp^3$ carbon peak almost completely disappeared, and only the $sp^2$ carbon peak remained, from which it can be found that the alkyl groups derived from the carbon and lithium or decomposition product precursors thereof remained in the prepared sample. On the other hand, it can be confirmed that the sp$^2$ carbon peak disappeared at 400° C. or higher, and it is inferred that disappearance of the sp$^2$ carbon peak indicates that hydrogen disappears and carbon is attached at the corresponding position.

The presence of the alkyl group suggests a very amorphous graphite state because the graphite sheet still exhibits a short, random and irregular shape. In the spectrum of the sample annealed at 300° C. for 1 min, the alkyl group capable of forming a graphite sheet branch disappeared, and thus it was found to be less amorphous than the sample annealed at 200° C. for 1 min. Also, the peak corresponding to the sp$^2$ carbon of the sample annealed at 200° C. for 1 min was relatively smaller than the peak of the as-prepared sample. This suggests that the linkage site of the sp$^2$ carbon, to which hydrogen is bound, still remained, indicating that the graphite sheet was not interconnected due to the long distance. In the sample treated at a temperature of 400° C. or higher, no more peaks were observed, which means that there was almost no hydrogen, indicating that the graphite sheet was present in a relatively expanded state.

Based on the above results, it can be deduced that there is a correlation between the change in the chemical shift value of $^7$Li NMR and the graphite form inferred from $^{13}$C—$^1$H CPMAS NMR analysis for the sample annealed at 400° C.

Figure 12:
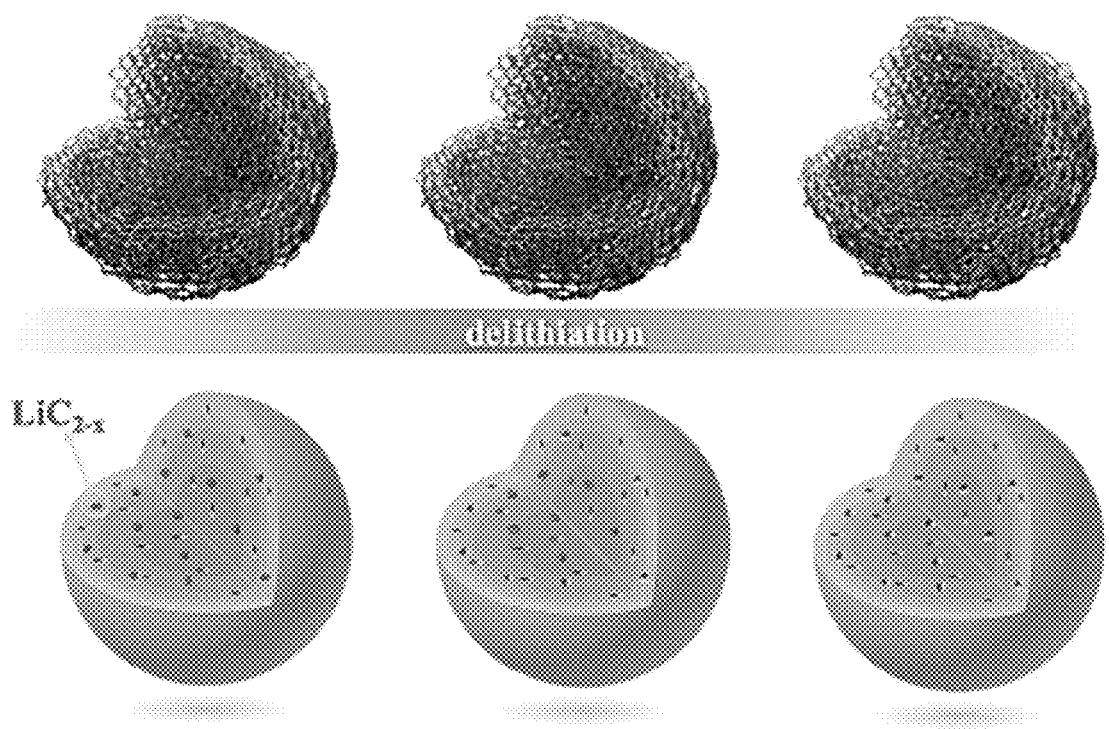
FIG. 12 shows the lithium-carbon composite during a delithiation process.

The internal structure of the lithium-carbon composite of the present invention is amorphous, as shown in FIG. 12, and a large number of cavities are formed therein. Therefore, lithium doped in the carbon may be present in a very free state in the cavities. Considering that the proportion of Peak-1 after annealing at 300° C. or less is high, it can be estimated that a significant amount of lithium is present in a state of being adsorbed to the cavities in the lithium-carbon composite. However, as the annealing temperature increases, graphitization proceeds, whereby carbon grows into a nanocrystalline graphite structure.

Consequently, a large number of nano-cavities disappear and lithium is collected between the graphite flakes, and all lithium is adsorbed into the narrow cavities, which is confirmed by the complete disappearance of Peak-2 at 400° C. Most of the lithium is adsorbed into the cavities. Specifically, as annealing progresses further, lithium is diffused and intercalated into a nanocrystalline graphite structure to form an extremely dense lithium-carbon composite, and the chemical shift moves to a lower frequency (upward electric field) due to the increased electron density around the lithium nucleus and magnetic steering. Also, the low chemical shift indicates the presence of Liz molecules in carbon. These results are consistent with the XPS results. Therefore, this dense lithium may be present in the form of $LiC_{2-x}$ as predicted by XPS.

Figure 13:
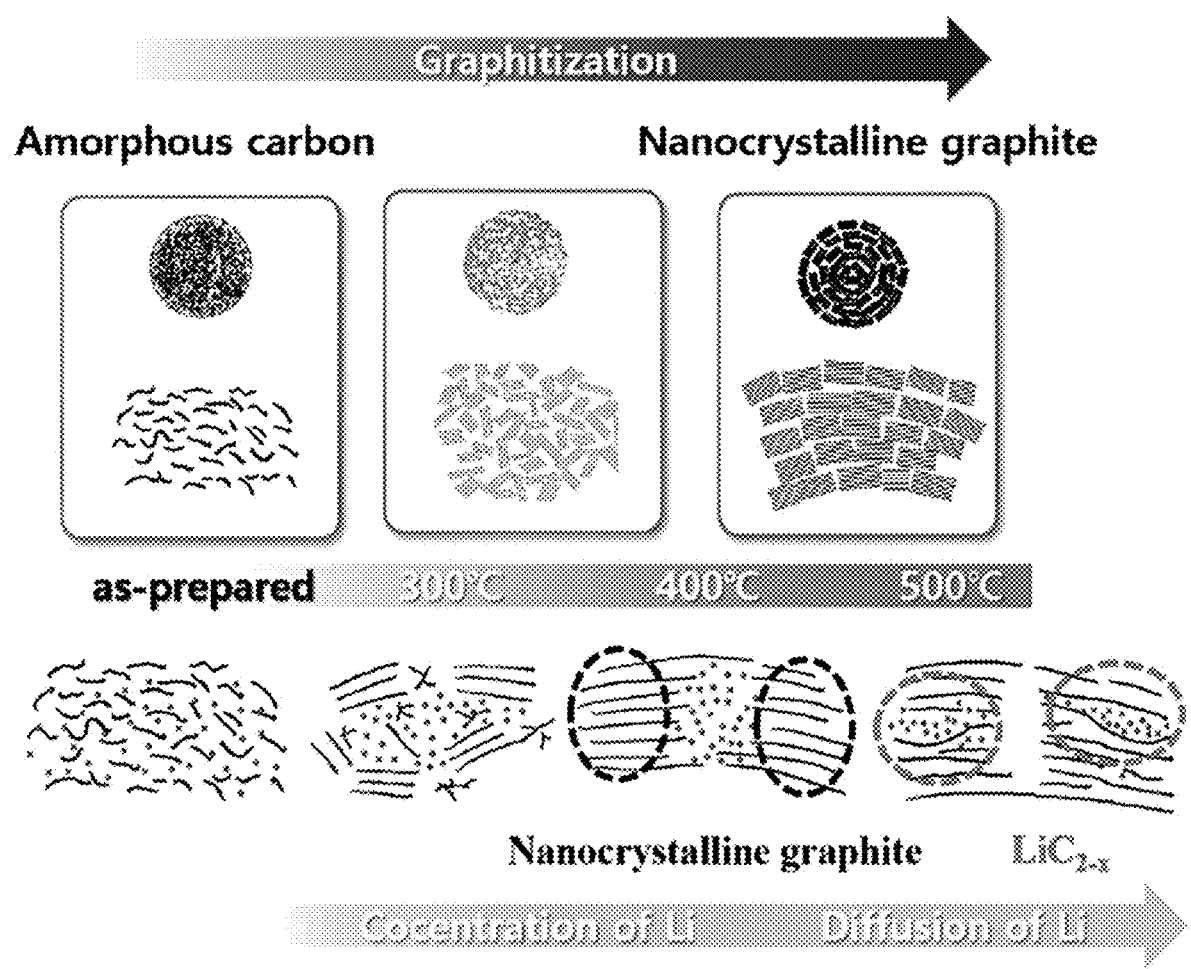
FIG. 13 shows the state of the lithium-carbon composite depending on the annealing temperature.

As shown in FIG. 13, the as-prepared lithium-carbon composite is configured such that lithium is present in the state of being simply polymerized in carbon. However, when annealing is performed, the arrangement of the carbon body and lithium is changed, and the carbon body is changed from amorphous carbon into nanocrystalline graphite. Upon annealing at 300° C., the carbon body is interconnected to some extent and lithium is present therein. Upon annealing at 400° C., the interconnection of the carbon body is longer than at 300° C., and lithium is present in an agglomerated state. Upon annealing at 500° C., lithium agglomeration becomes more severe than at 400° C., and cavities are formed due to lithium agglomeration. As the annealing temperature increases, the extent of agglomeration of the carbon body and lithium increases, so a $LiC_{2-x}$ lithium-carbon composite can be formed. The $LiC_{2-x}$ lithium-carbon composite has a crystalline structure.

Figure 14:
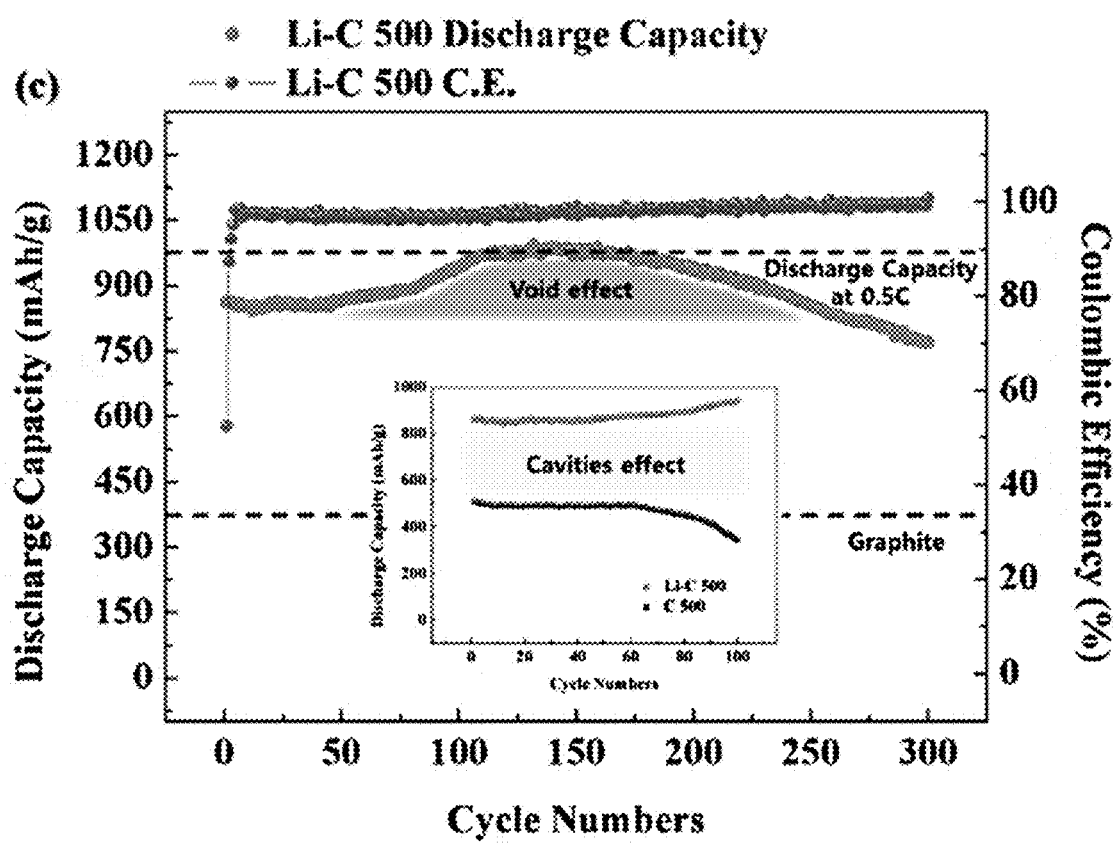
FIG. 14 is a graph showing discharge capacity depending on the number of charge and discharge cycles of the lithium-carbon composite.

FIG. 14 is a graph showing the discharge capacity (mAh/g) depending on the number of charge and discharge cycles in order to evaluate the effect of cavities on lithium charge and discharge. When compared with the theoretical capacity of a lithium-carbon composite annealed at 500° C. (Li—C 500 C.E.), the actual discharge capacity of the lithium-carbon composite (Li—C 500 discharge capacity) is initially about 800 mAh/g, but is increased to 1000 mAh/g, which approaches the theoretical capacity, with an increase in the number of cycles. This means that as the number of charge and discharge cycles increases, the already agglomerated lithium is released together upon discharge from the lithium-carbon composite during lithium charge and discharge processes, and cavities are formed in the corresponding region. Due to the formation of cavities, lithium is easily charged in the corresponding position upon the next charge, thereby increasing the charge and discharge capacity. When the lithium-carbon composite of the present invention is applied to a lithium secondary battery, there is an advantage in that the charge and discharge performance of the lithium secondary battery is increased by this cavity effect.

Figure 15:
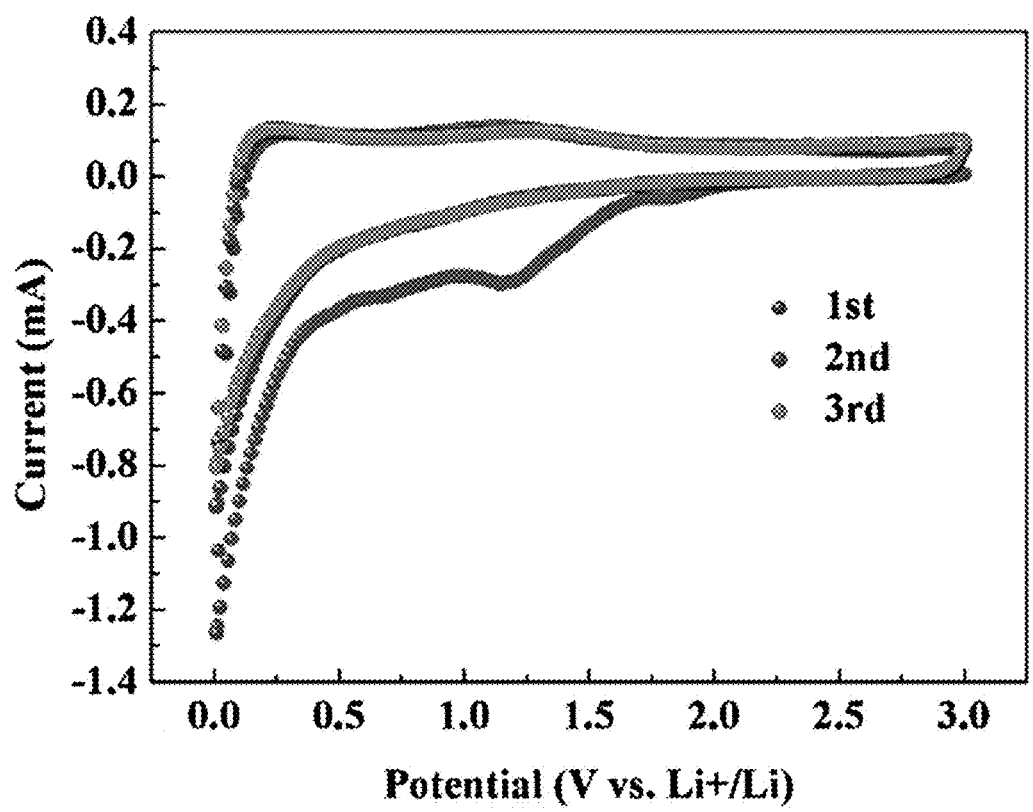
FIG. 15 is a CV graph showing the results of charging and discharging of the lithium-carbon composite.

This can also be confirmed through the graph of FIG. 15. FIG. 15 is a CV graph in which Li—C 500 is charged and discharged at a scan rate of 0.2 mVs$^{-1}$ in the voltage range of 0.005-3 V. Thereby, the charge and discharge properties can be confirmed to be stable even when the lithium-carbon composite of the present invention is used. It can be seen that the $2^{nd}$ and $3^{rd}$ current values are greater than $1^{st}$.

Figure 16:
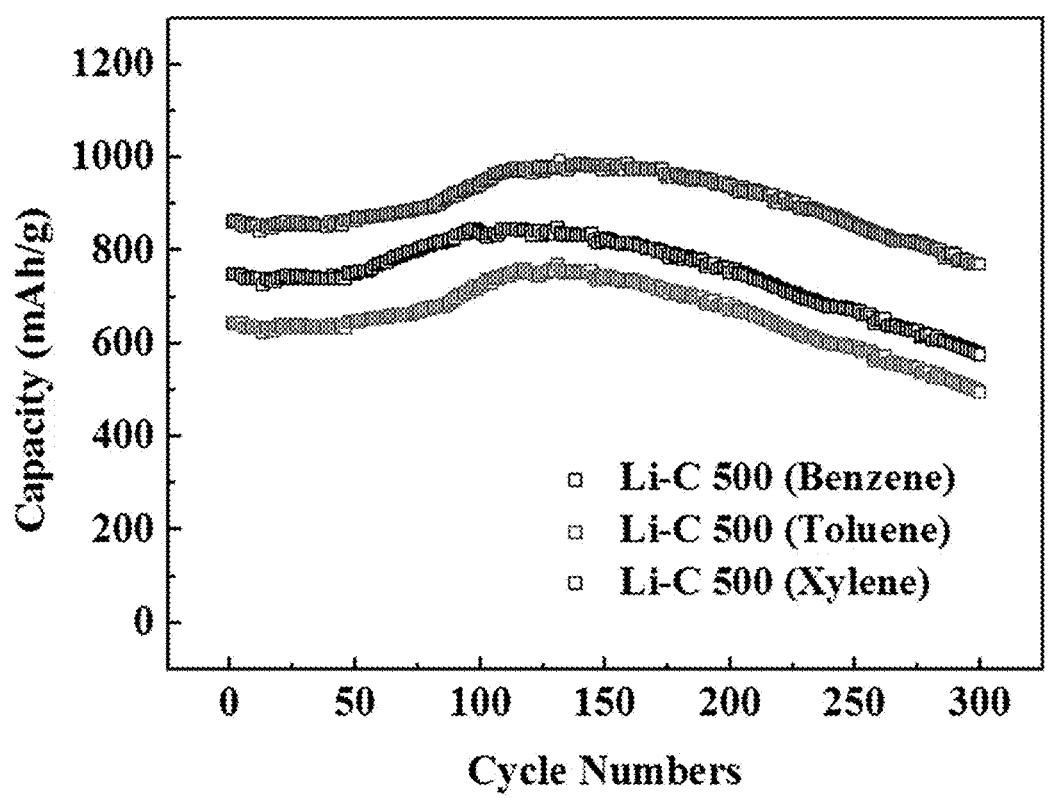
FIG. 16 is a graph showing the discharge capacity of the lithium-carbon composite depending on the type of organic solvent used for plasma discharge in a solution.

FIG. 16 is a graph showing the discharge capacity of the synthesized lithium-carbon composite depending on the type of organic solvent used for plasma discharge in a solution and depending on the number of cycles. Here, examples of the organic solvent include benzene, toluene, and xylene. In these three solvents, the discharge capacity pattern was generally similar, with xylene exhibiting the highest discharge capacity among the three organic solvents. Therefore, the most preferred organic solvent used for plasma discharge in solution is xylene.

The reason why the lithium-carbon composite manufactured according to the present invention has a capacity 3 times as high as that of conventional graphite is as follows. 1) Cavities are present due to the movement and concentration of doped lithium, and 2) the doped lithium is released together during charging and discharging, so cavities are formed in regions in which lithium was present. It can be confirmed that the high capacity of the lithium-carbon composite of the present invention lasted up to 250 cycles and then gradually decreased to 90% or less of the initial capacity at about 300 cycles.

Therefore, according to the present invention, a lithium-carbon composite can be manufactured in a simple manner using plasma discharge in solution, and can be annealed to afford a lithium-carbon composite having cavities formed therein. Since the lithium-carbon composite has cavities formed therein, lithium charge and discharge performance becomes excellent, and the lifespan and performance of a lithium secondary battery using the lithium-carbon composite are increased.

What is claimed is:
1. A method of manufacturing a lithium-carbon composite having cavities formed therein, comprising:
preparing an organic solvent having an aromatic ring mixed with a lithium precursor;
arranging a pair of metal wires immersed in the organic solvent;

applying bipolar-pulsed direct-current power to the metal wires to perform plasma discharge in a liquid phase to form a lithium-carbon composite in which lithium atoms are intercalated into a carbon agglomerated body;

removing any remaining organic solvent to separate the lithium-carbon composite; and annealing the lithium-carbon composite in order to remove hydrogen from the lithium-carbon composite and to form cavities in the lithium-carbon composite.

2. The method of claim 1, wherein the organic solvent is an organic solvent comprising a hydrocarbon (HC), which is present in a solution at room temperature and is composed exclusively of carbon (C) and hydrogen (H) without other elements.

3. The method of claim 2, wherein the organic solvent is selected from the group consisting of xylene, benzene, toluene and mixtures thereof.

4. The method of claim 1, wherein the lithium precursor is cyclopentadienyl lithium.

5. The method of claim 1, wherein the plasma discharge is performed in an oxygen free environment.

6. The method of claim 1, wherein the annealing of the lithium-carbon composite is performed at a temperature that is sufficient to remove substantially all hydrogen from the lithium-carbon composite to cause lithium agglomeration.

7. The method of claim 6, wherein the annealing of the lithium-carbon composite is performed at 400° C. or more.

8. A lithium-carbon composite having cavities formed therein, in which a carbon body is doped with lithium through plasma discharge in a solution and in an interior of which cavities are formed through annealing, and which has a composition of $LiC_x$ (wherein x is 4 to 2-y, y being 0.001 to 1.999).

9. The lithium-carbon composite of claim 8, wherein the amount of lithium in the lithium-carbon composite is 4 to 6 wt % based on 100 wt % of the lithium-carbon composite.

\* \* \* \* \*